United States Patent
Brockhoff

(10) Patent No.: US 7,762,612 B2
(45) Date of Patent: Jul. 27, 2010

(54) CONVERTIBLE ROOF THAT LATCHES TO AN UPPER TRANSVERSE FRAME PART OF THE WINDSHIELD FRAME

(75) Inventor: Franz-Ulrich Brockhoff, Bramsche (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 11/996,170

(22) PCT Filed: Jul. 1, 2006

(86) PCT No.: PCT/DE2006/001142

§ 371 (c)(1),
(2), (4) Date: Jul. 21, 2008

(87) PCT Pub. No.: WO2007/009417

PCT Pub. Date: Jan. 25, 2007

(65) Prior Publication Data

US 2008/0290688 A1    Nov. 27, 2008

(30) Foreign Application Priority Data

Jul. 21, 2005    (DE) .................. 10 2005 034 726

(51) Int. Cl.
*B60J 7/185* (2006.01)

(52) U.S. Cl. .................. 296/121; 292/DIG. 5
(58) Field of Classification Search ......... 296/121; 292/DIG. 5
See application file for complete search history.

(56) References Cited

U.S. PATENT DOCUMENTS

| | | | | | |
|---|---|---|---|---|---|
| 1,434,351 | A | * | 10/1922 | Goodwin | 296/120.1 |
| 3,135,541 | A | * | 6/1964 | Kwasek | 292/64 |
| 4,819,983 | A | | 4/1989 | Alexander et al. | |
| 5,678,881 | A | * | 10/1997 | Tokarz | 296/121 |
| 5,755,467 | A | * | 5/1998 | Dilluvio et al. | 292/32 |
| 6,227,605 | B1 | | 5/2001 | Weisser et al. | |
| 2004/0032148 | A1 | * | 2/2004 | Hasselgruber et al. | 296/121 |

FOREIGN PATENT DOCUMENTS

DE    29703603    1/2000
GB    604326    7/1948

* cited by examiner

*Primary Examiner*—Dennis H Pedder
(74) *Attorney, Agent, or Firm*—Gifford, Krass, Sprinkle, Anderson & Citkowski, P.C.; Douglas L. Wathen

(57) ABSTRACT

A convertible vehicle according to the present invention includes a vehicle body with a windshield frame with an upper transverse frame part. A convertible roof for the vehicle has a front end. At least one hook part is disposed in the upper transverse frame part and is linearly movable in the upper transverse frame part.

41 Claims, 14 Drawing Sheets

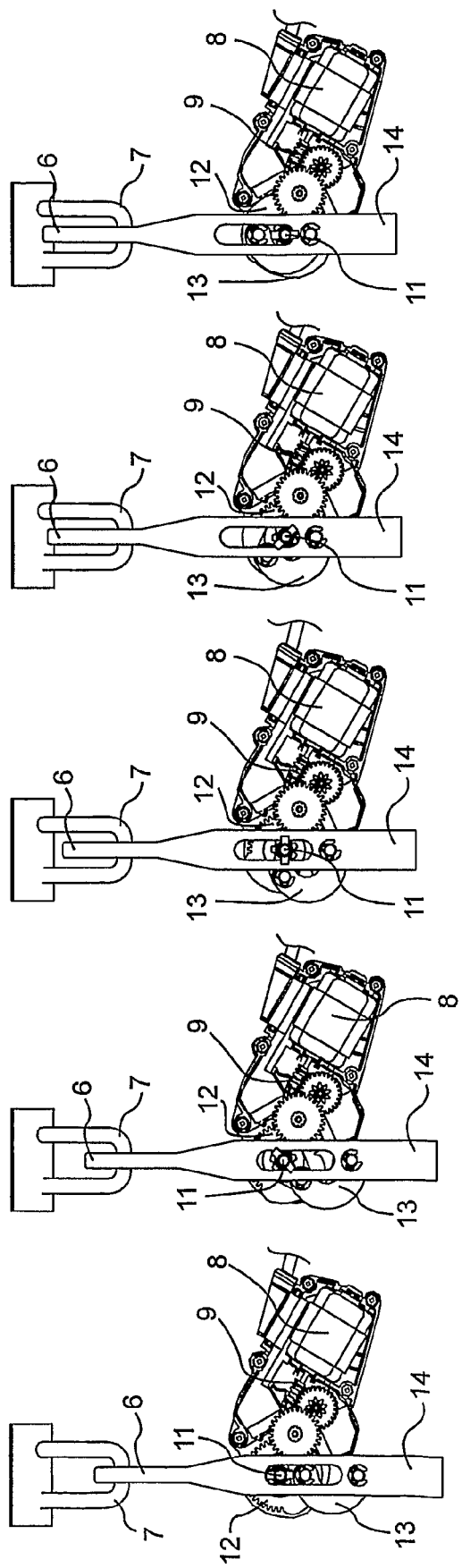

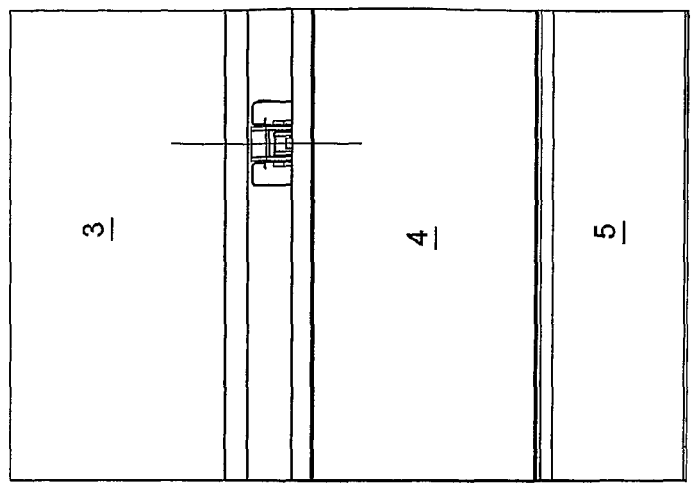
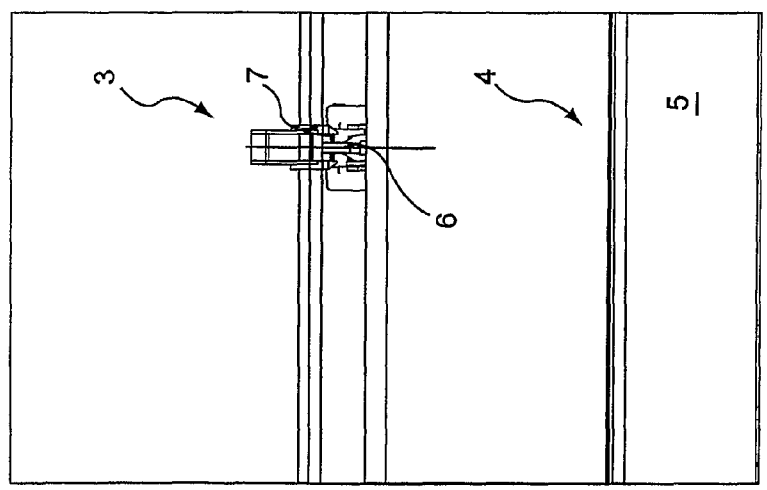
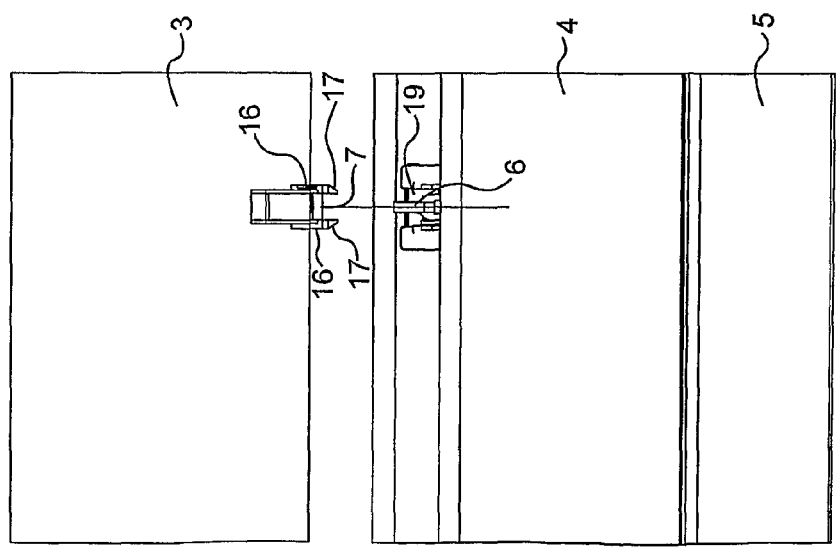
Fig. 14 and downwardly. Such a solution can in particular be considered for vehicles with a windshield set at a shallow angle and with a relatively wide upper transverse frame part which extends upwardly and rearwardly from the windshield. Such a design provides sufficient movement space for displacement of the hook parts to the front and downwardly in the plane of the cowl. If the roof tip is positioned close, the capturing path only has to amount to some few millimeters so that only a little movement space is required for the hook parts.

CONVERTIBLE ROOF THAT LATCHES TO AN UPPER TRANSVERSE FRAME PART OF THE WINDSHIELD FRAME

REFERENCE TO RELATED APPLICATIONS

This application is the United States national phase application of PCT/DE2006/001142, filed Jul. 1, 2006, which claims priority from German patent application No. DE102005034726.6, filed Jul. 21, 2005, the entire content of both of which are incorporated herein by reference.

FIELD OF THE INVENTION

The invention relates to a convertible vehicle comprising a roof which can be secured in its closed position to an upper transverse frame part of the windshield frame.

BACKGROUND OF THE INVENTION

The front end or tip of a convertible roof is typically latched to the windshield frame using closing members when the roof is closed. Typically, hook parts and aligning centering spigots are provide on the front end of the roof. The hook parts drop into corresponding recesses of the windshield frame and cooperate with latches provided in the windshield frame. The latches typically pivot to engage the hook parts.

It is desirable to reduce the weight of the roof tip in order to reduce the inertia of the roof as it pivots about lateral main bearings and to reduce the dimensions of the latch drives. In addition, the risk of injury which can result from hook parts projecting from the roof tip when the roof is open should be minimized.

It is known from DE 297 03 603 U1 to provide a central pivot hook in the upper transverse frame part of the windshield frame and to capture and secure a latch fixedly to the roof tip by pivoting the hook inwardly. A construction of this type, however, requires substantial construction space both in the vertical direction and in the transverse direction of the vehicle. This space is not available in some vehicles such as smaller vehicles in which occupants sit close to the windshield frame.

SUMMARY OF THE INVENTION

A convertible vehicle according to the present invention includes a vehicle body with a windshield frame with an upper transverse frame part. A convertible roof for the vehicle has a front end. At least one hook part is disposed in the upper transverse frame part and is linearly movable in the upper transverse frame part.

No pivot space for a hook part is required with the present invention. The construction height is therefore considerably reduced. The at least one hook part can be completely disposed in the upper transverse frame part of the windshield frame. The roof tip only requires relatively light and rounded latch parts; the stability of the A pillars remains unaffected since they do not have to be modified by the arrangement of the closing parts.

A reliable capturing of the roof tip and exertion of a securing pulling force can also be ensured without a pivoting of the hook part. Each hook part is linearly movable in the transverse frame part with a forward component of the linear movement for the closing of the connection. The hook are preferably linearly movable with a forward component of the linear movement and a downward component of linear movement in a transverse frame part disposed with a slight inclination. Thus, the movement can tension the roof to the front Because the hook part or parts are aligned longitudinally to the vehicle, only a minimal part of the width of the cowl is taken up. Much of the width thus remains unaffected by the closing parts and can be configured as a head impact surface for occupants during possible accidents.

A high stability of the roof securing arrangement can be achieved via at least two hook parts which are disposed close to the transverse edge regions of the vehicle. But, the hook parts do not need to extend up to and into the A pillars and thereby weaken them. The same parts can be used for both vehicle sides.

If a plurality of hook parts can be driven individually via electric motors, no synchronization linkages or the like are required. The space between the hook parts can therefore remain fully available as a safety region for a head impact. The motors themselves can be made small, since they each only have to move one hook part, and can likewise be disposed in a space saving manner completely in the cowl. In addition, no long linkages or control cables have to be provided. The construction is maintenance-free over long time periods.

The drive shafts of the electric motors are preferably disposed generally parallel to the upper crossmember of the windshield frame and far to the front toward the windshield.

Each hook part may be driven by a toothed wheel that is rotatable about an axis disposed perpendicular to the direction of movement of the hook part. A force transmitting member is connected to the hook part and is curved such that it does not intersect the axis of rotation of the toothed wheel. This allows manual emergency actuation by engaging the axis of this toothed wheel from below using a corresponding wrench.

The roof can be centered without separate centering spigots by providing centering aids which have tapered surfaces disposed to the side next to the latch. These tapered surfaces are received into a complementary funnel of the hook part. Tapered surfaces can be provided which face toward each transverse side of the vehicle as well as toward the front and rear and enable positioning in all spatial directions.

With the omission of separate centering aids, a single one sensor, for example a contact-free Hall sensor, is preferably provided at each connection between the windshield frame and the front end of the roof to verify the correct closing condition. As such, separate sensors for the engagement of the centering spigot and the capturing of the latch are not necessary.

BRIEF DESCRIPTION OF THE DRAWINGS

Advantages of the present invention will be readily appreciated as the same becomes better understood by reference to the following detailed description when considered in connection with the accompanying drawings.

FIG. 6 is a schematic view of the hook part from below in a closed position with an enclosed latch of the front end of the roof;

FIG. 7 is a similar view to FIG. 6 during movement of the hoop part in the release direction;

FIG. 8 is a similar view to FIG. 7 with the hook part opened further;

FIG. 9 is a similar view to FIG. 8 with the hook part opened further yet;

FIG. 10 is a similar view to FIG. 9 with the hook part fully open in the position of FIG. 4;

FIG. 14 illustrates the closing phase of FIG. 13 in a view from above, with the front end of the roof being drawn as transparent;

DETAILED DESCRIPTION OF THE INVENTION

Figure 1:
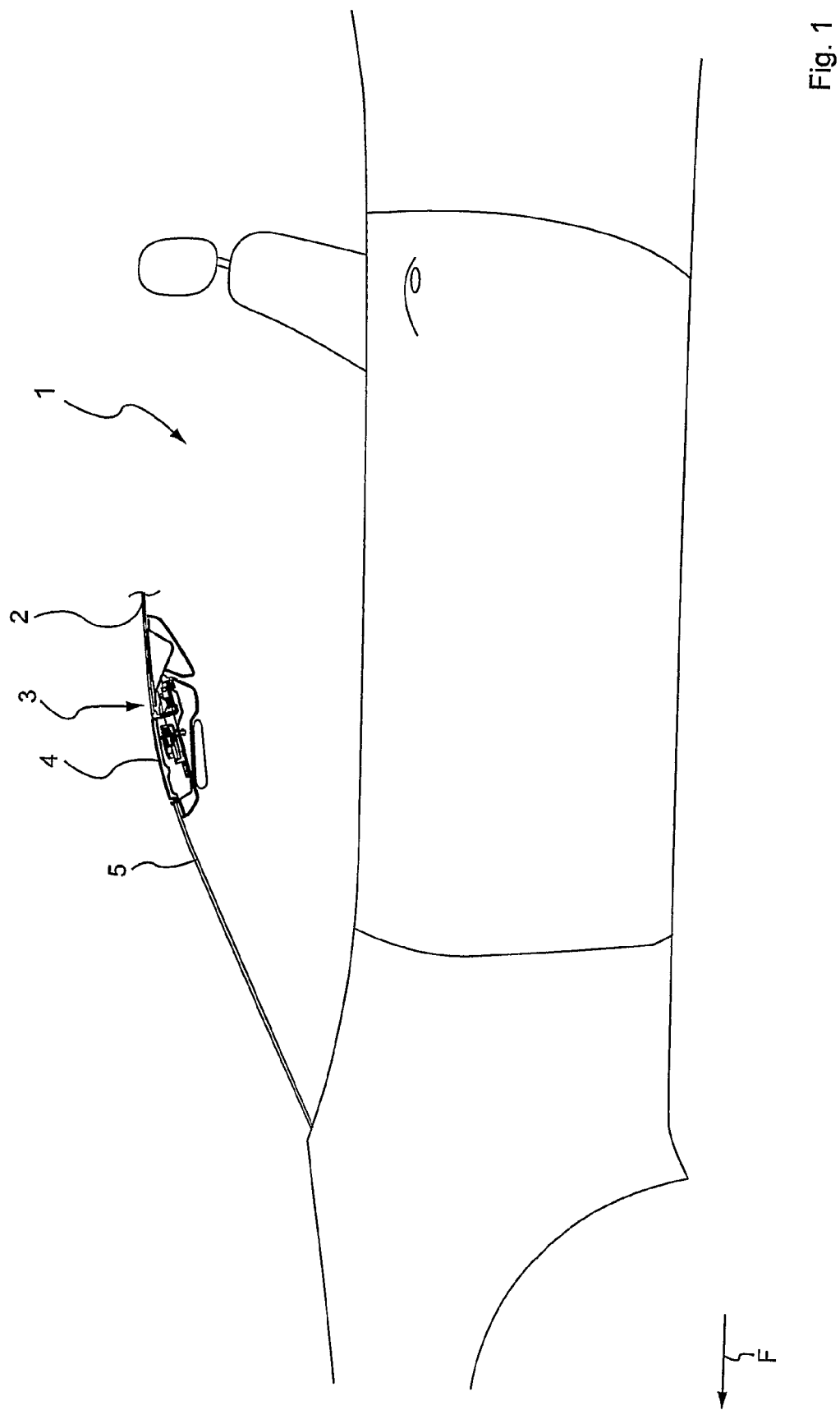
FIG. 1 is a schematic side view, broken open to the front and to the rear, of a convertible vehicle in accordance with the invention with a closed roof.

The convertible vehicle 1, which is only partially shown in the drawing, comprises a movable roof 2 that can be configured, for example, as a retractable hardtop (RHT) or as a soft top with a front end 3 of the roof that is rigid.

It is understood that the roof shape and the vehicle size can be made differently. For example, the convertible vehicle 1 can be either a two-seater or a convertible vehicle with a larger passenger space and, for instance, two or more rows of seats behind one another.

Figure 2:
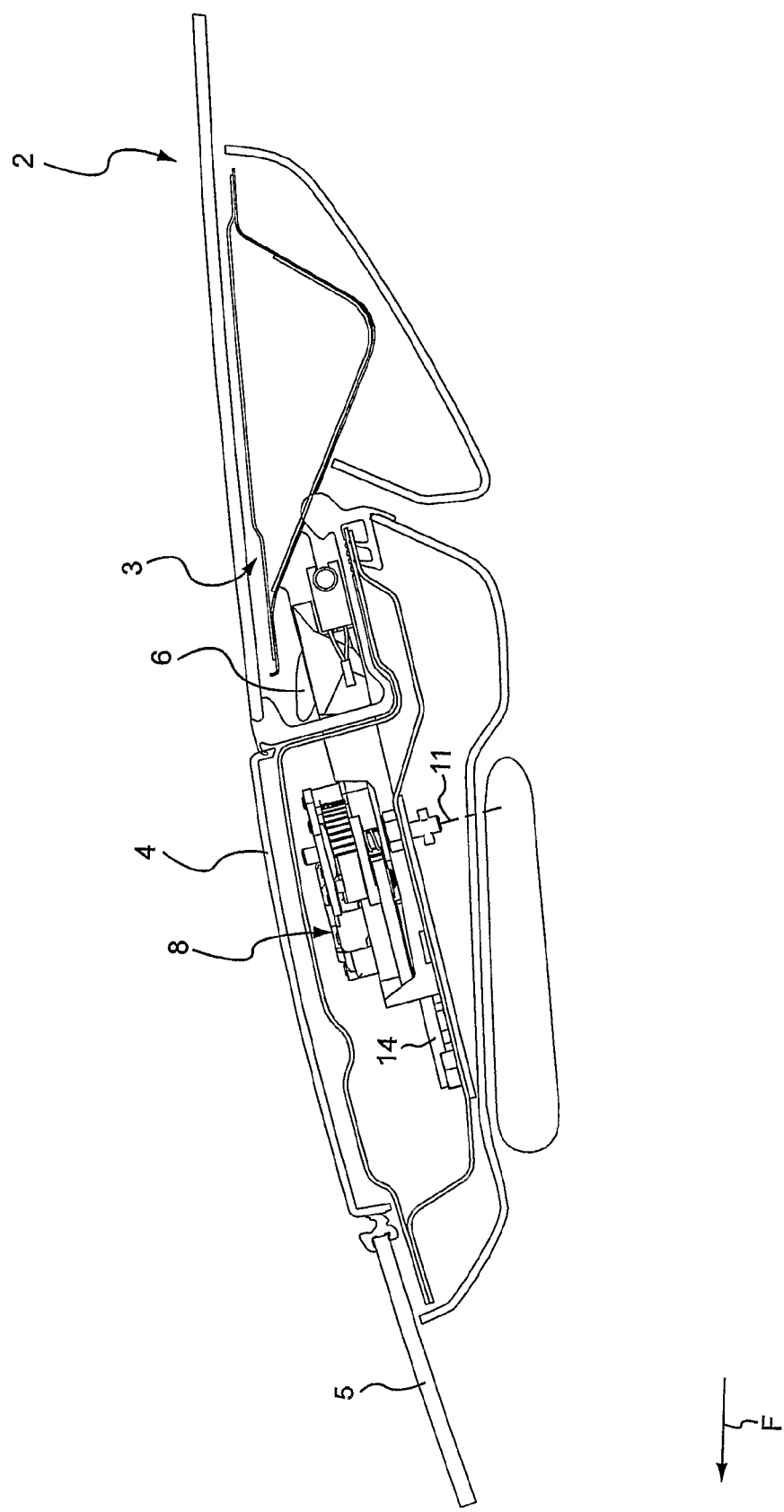
FIG. 2 is a detailed view of the front end of the roof in the position of FIG. 1.
Figure 3:
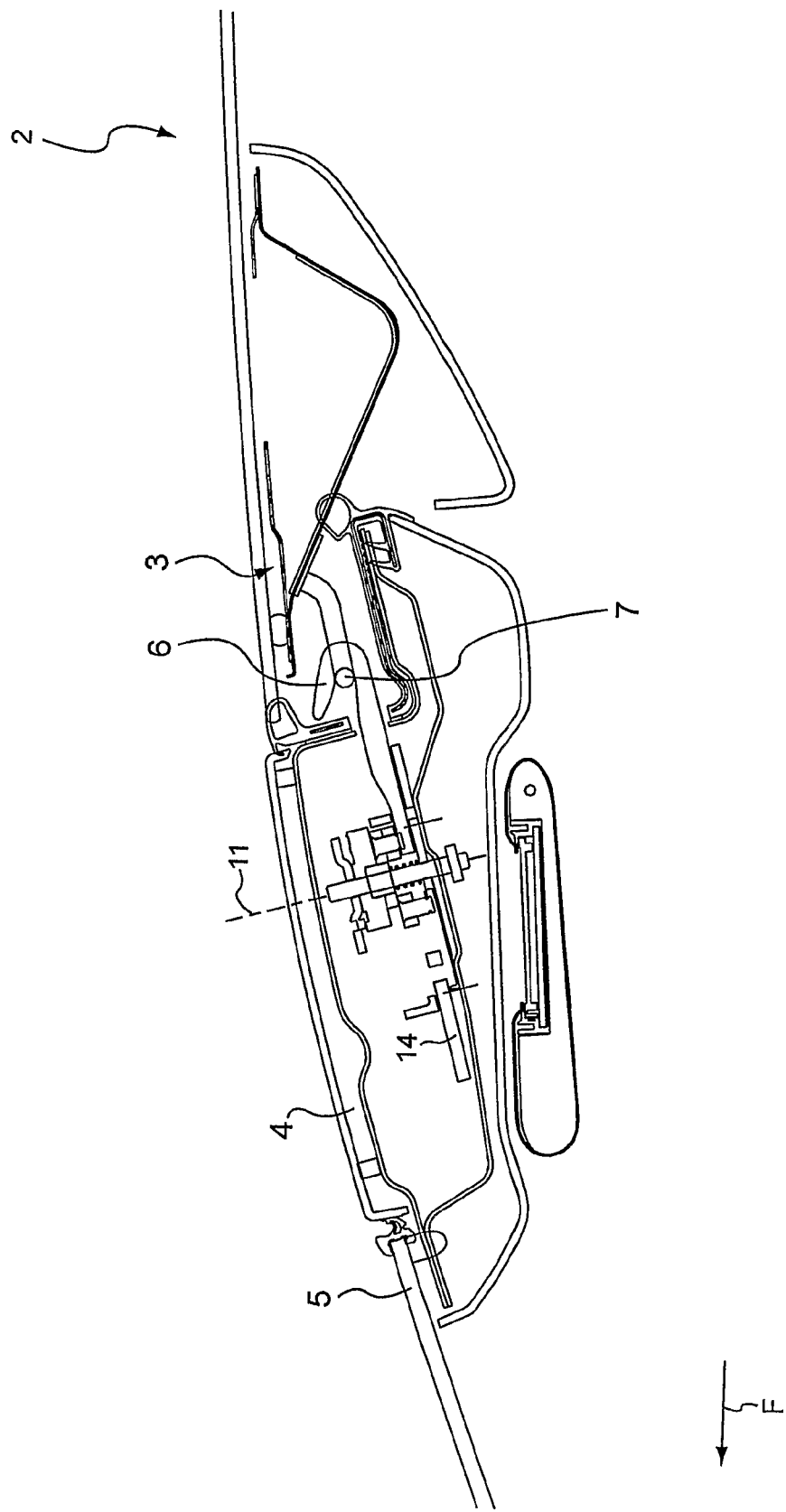
FIG. 3 is a similar view to FIG. 2, but without the latch centering aids and associated run-in ramps and the sensors for the detection of proper closing being shown.
Figure 4:
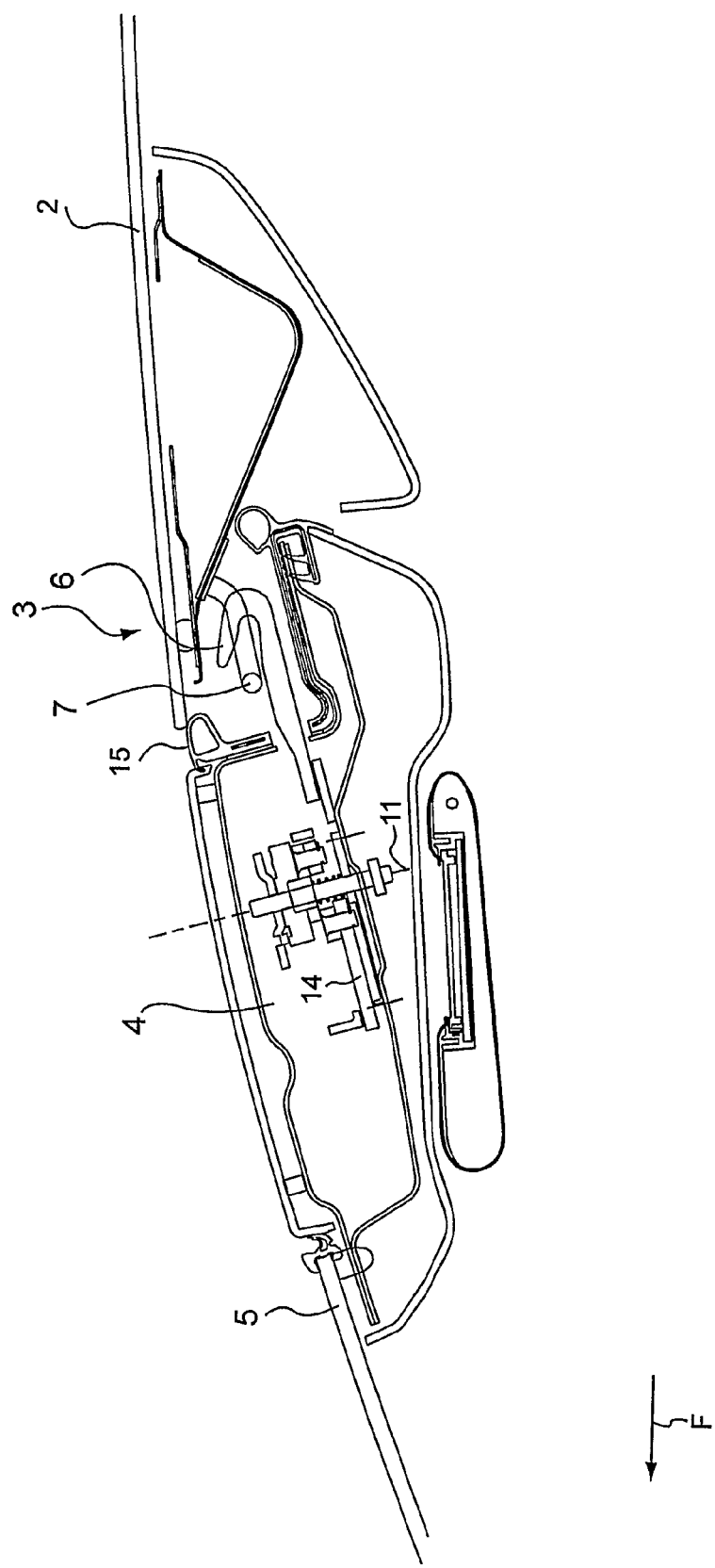
FIG. 4 is a similar view to FIG. 3 with the hook part displaced to the rear so that the front end is unlatched before opening.
Figure 5:
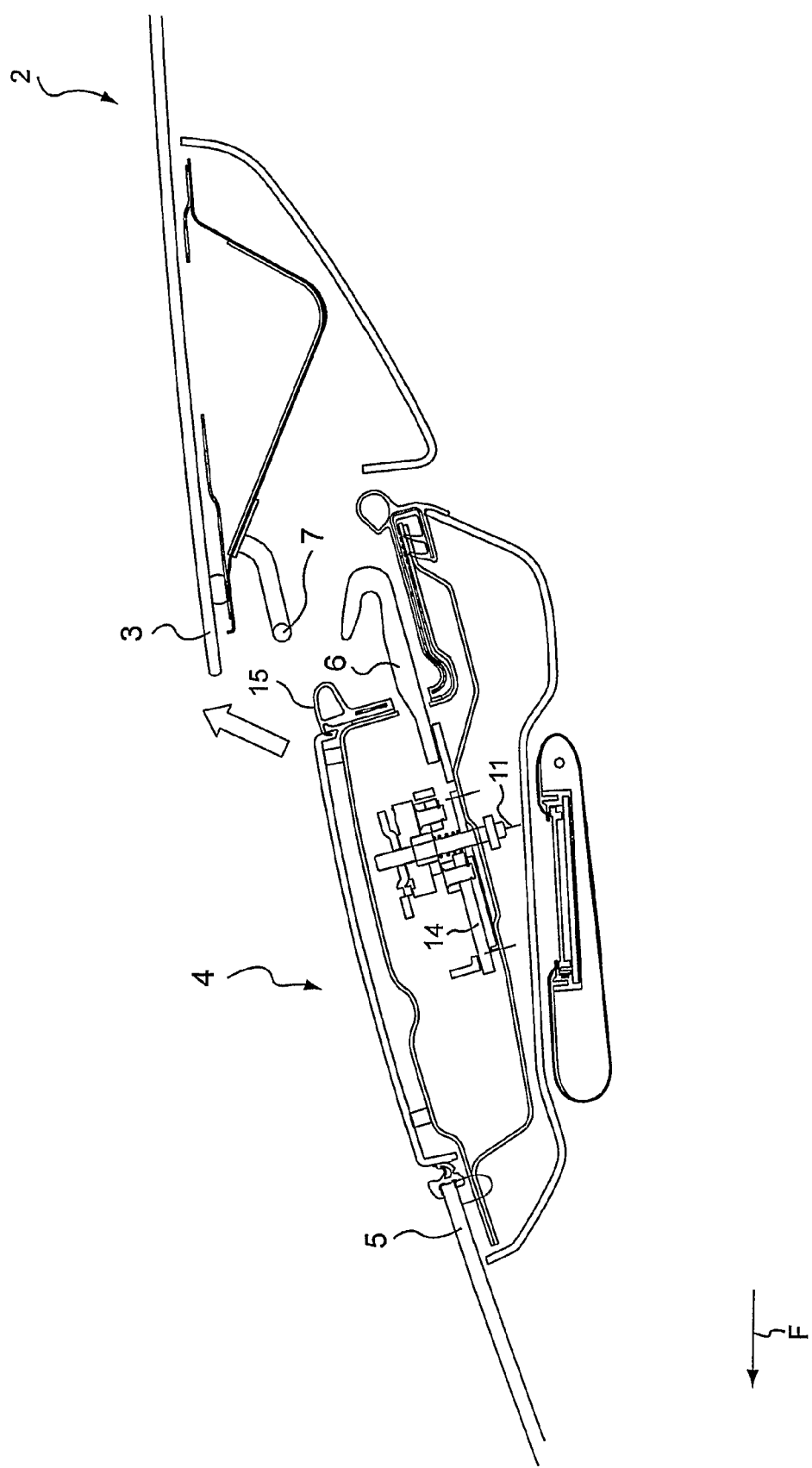
FIG. 5 is a similar view to FIG. 4 with the roof starting to open.

As shown in FIGS. 1-3, the front end 3 of the roof, also called a roof tip, is latched to an upper crossmember 4, frequently also called a cowl or a header, of a frame enclosing the windshield 5. At least one moving hook part 6 is provided which can secure a latch 7 of the roof tip 3.

For this securing or release of the latch 7, the at least one hook part 6 can be moved linearly in the upper cross-frame part 4. In the illustrated embodiment, two hook parts 6 are provided which are mutually spaced apart in the transverse direction of the vehicle and secure the roof 2 in its closed position. The hook parts 6 are, however, only mutually spaced apart so far that the upwardly projecting side pillars of the windshield frame, so-called A pillars, can remain unaffected by the closing devices.

In order for the hook parts 6 to close the connection the hook parts are moved in a direction that has a forward component in the direction of vehicle travel F and that has a downward component approximately parallel to the obliquely forwardly inclined installation position of the cowl 4. The cowl can thus have a minimal thickness. A small construction height is required for the hook parts 6 and their moving mechanisms.

The hook parts 6 can be driven individually via electric motors 8, which are also small due to the low mass to be moved and in order to be integrated into the cowl 4.

Figure 11:
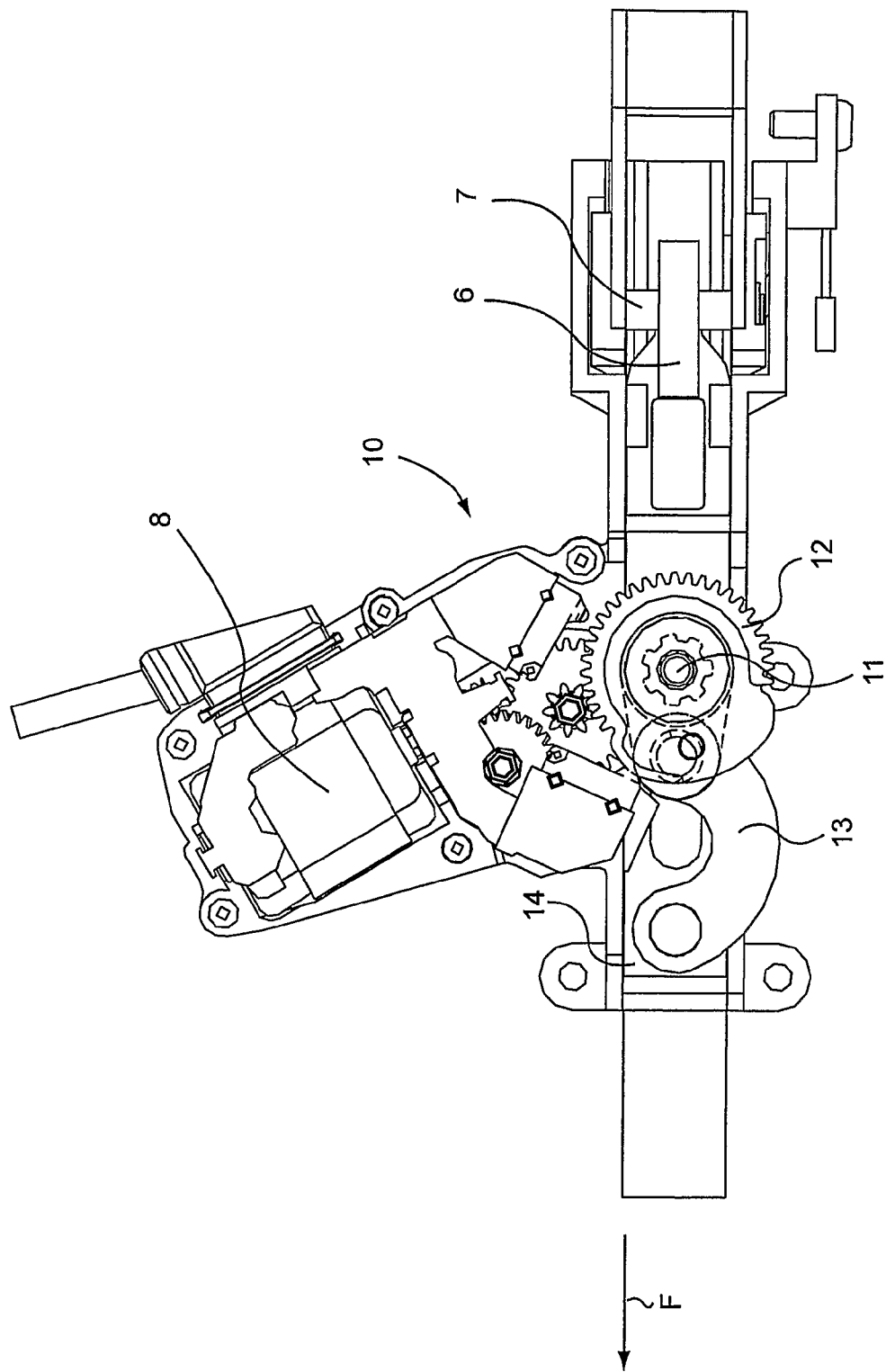
FIG. 11 is an enlarged view of the hook part from above in a closed position with the centering aids shown.
Figure 12:
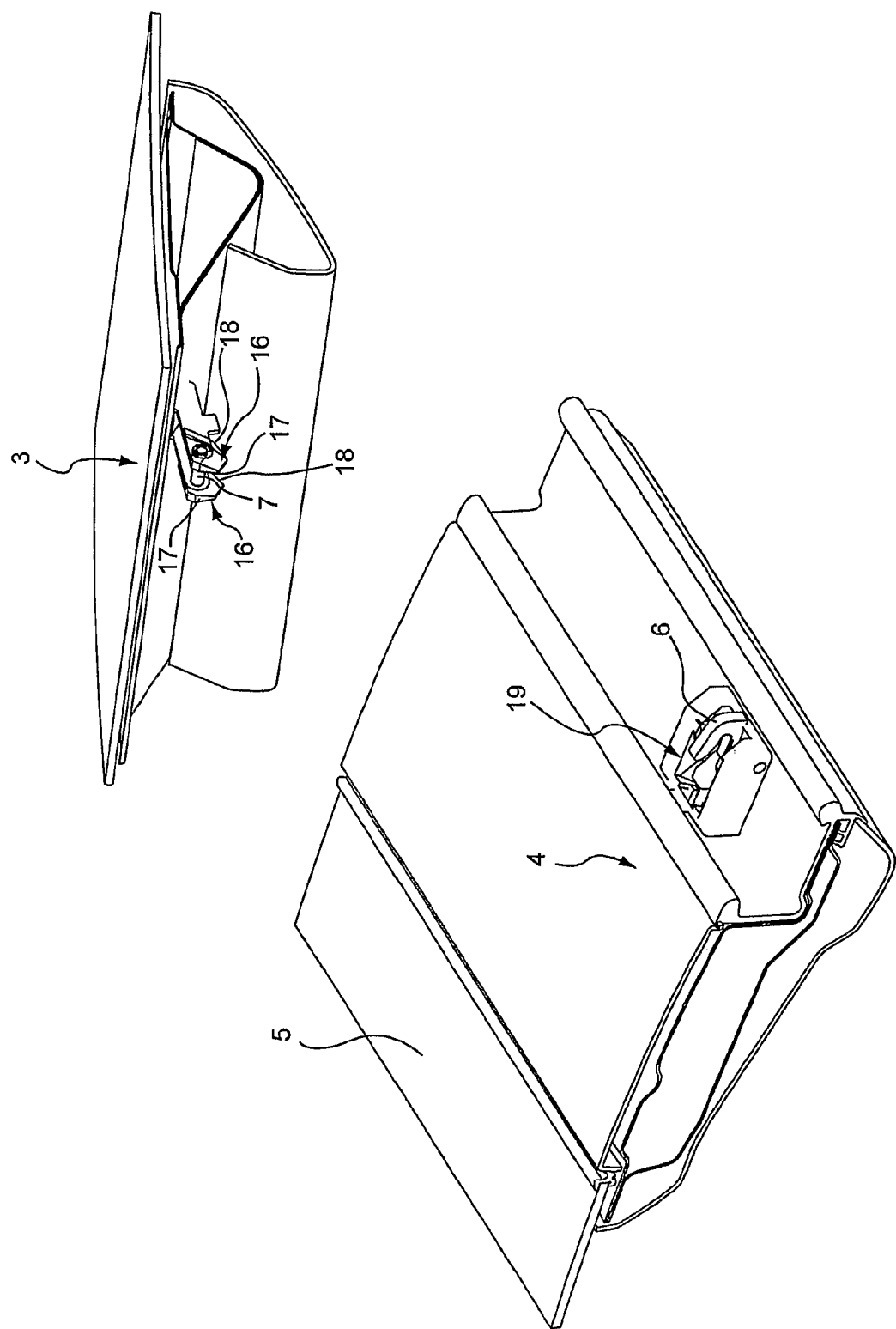
FIG. 12 is a perspective view of a section of the header and of the front end of the roof.

As shown, for example, in FIG. 11, the electric motors 8 are disposed next to the movement paths of the hooks 6 such that the required construction height can be kept small. The same parts can be used for both vehicle sides. The drive shafts 9 of the electric motors 8 are also disposed generally parallel to the upper crossmember 4 of the windshield frame and include a spindle for driving a force-diverting transmission 10.

The transmission drives each hook part 6 longitudinally and is preferably made as one unit. The transmission includes a drive wheel 12 which is provided with teeth over at least some of its periphery and is rotatable around an axis 11 disposed perpendicular to the direction of movement of the hook part 6. The axis 11, which is stationary with respect to the vehicle body, is disposed approximately perpendicular to the plane of the cowl 4.

A force transmitting member 13 has one end connected to the drive wheel 12 and drives the hook part 6. The force transmitting member 13 has an arcuate shape and has an opposite end that is connected to the forward-facing shaft 14 of the hook part 6. The force transmitting member 13 is curved such that it does not intersect the axis of rotation 11 of the drive wheel 12 in any phase of the movement of the hook part (FIG. 6 to FIG. 10). The axis of rotation therefore remains accessible from below, that is from the direction of the passenger space of the vehicle. An additional wrench, for example a simple hex key, can engage the axis 11 for a manual emergency actuation and can allow a manual operation of the hook parts 6 without any special effort even if there is a failure of the motorized drive.

Figure 18:
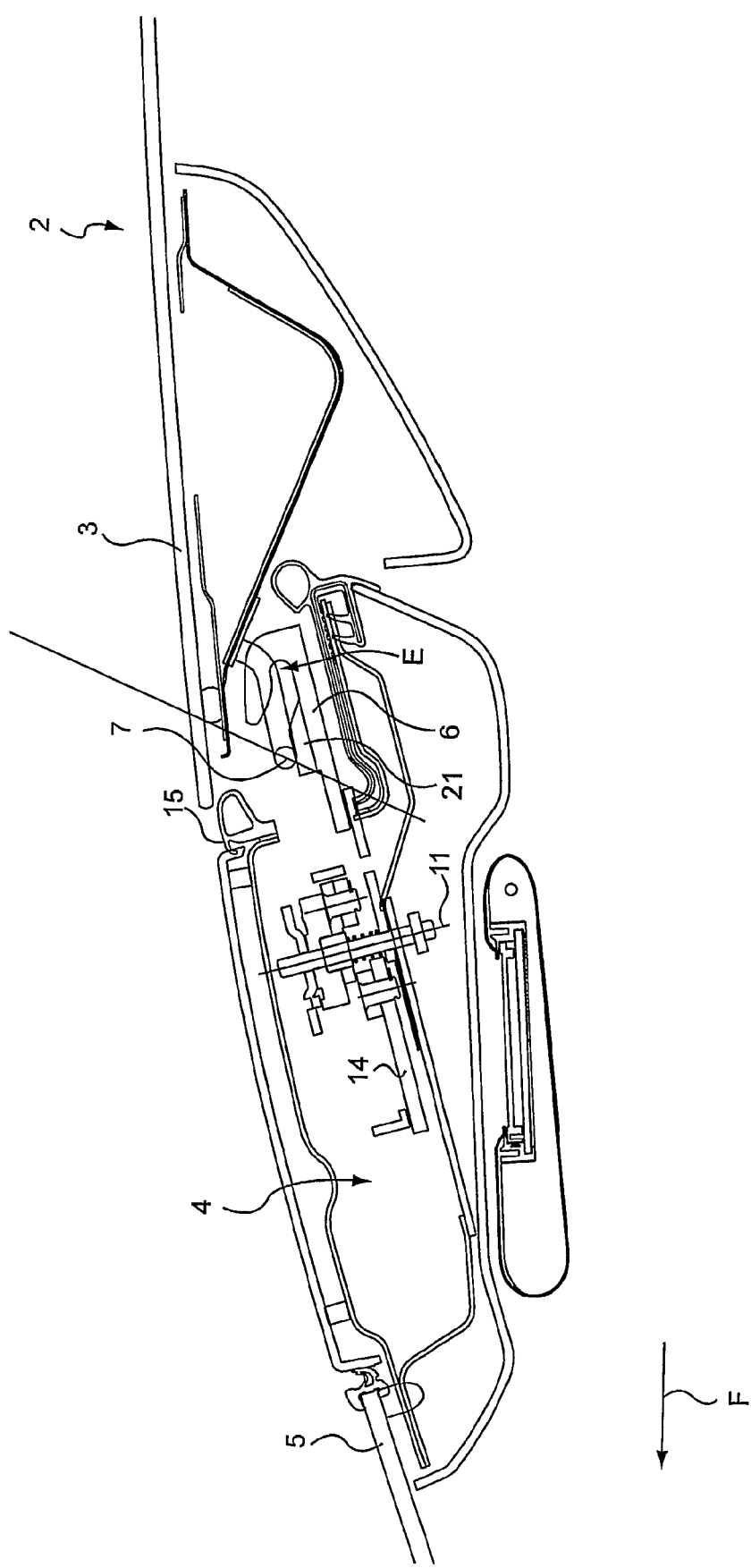
FIG. 18 is a similar view to FIG. 17 after the roof tip is closed.

As shown in FIG. 18, the rigid front end of the roof can be lowered together with the latch 7 until coming to rest on a seal 15 or a contact surface 21, which can serve as an elastic buffer for the upwardly open hook part 6. At this point, the hook part 6 is in its position disposed furthest to the rear. The contact surface 21 limits the drop-in depth of the latch 7 in this situation.

The hook part 6 only needs to travel a short distance in order to close the hook part 6 from the position shown in FIG. 18. The latch 7 is displaced downwardly to the front a distance of zero to eight millimeters from the intermediate position provided by the roof drive. The vertical capture path for the enclosure of the latch 7 up to and into its end position E is also very small and is typically around five to nine millimeters. The short paths ensure that the construction space for the closures can be very small overall.

To enable the front end 3 of the roof to latch without separate centering spigots or the like, centering aids 16, 17, 18 are associated with the latches 7 at the front end 3 and with the associated hook parts 6. In the illustrated embodiment, the centering aids include tapered surfaces 16 which are disposed to the side next to the latch 7, and which are received into a complementary funnel 19 of the hook part 6 and thereby enable a transverse centering.

In addition, tapered surfaces 17, 18 face to the front and to the rear and can also be made as front and rear chamfered areas of the surfaces 16 and be provided next to the surfaces 16 facing toward each transverse side of the vehicle. All the surfaces 16, 17, 18 can have complementary guide surfaces in a receiving funnel 19 of the hook part 6 which also enable an exact alignment of the latch 7 without separate centering spigots when the latch drops into place. Therefore, centering spigots are superfluous.

Figure 13:
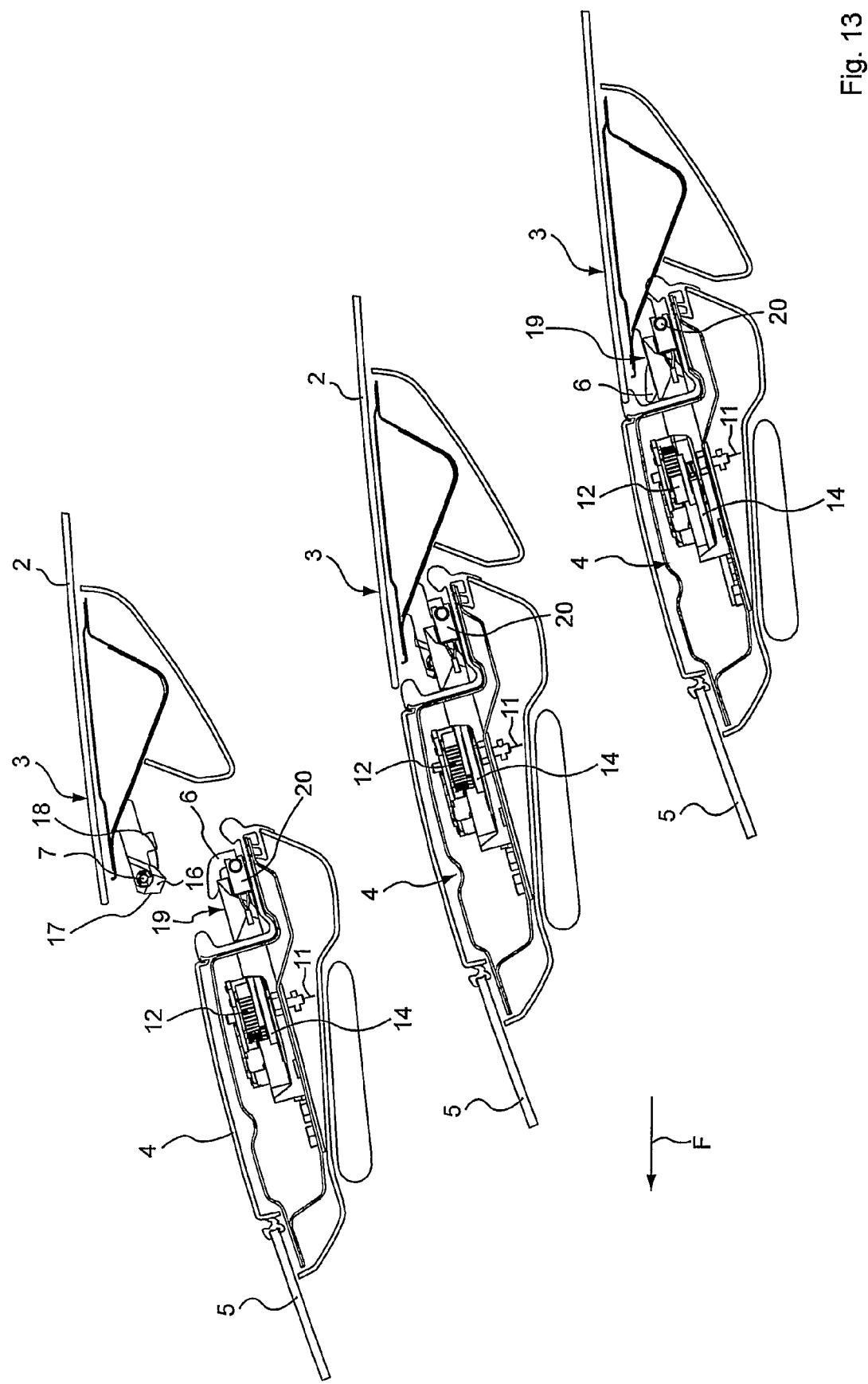
FIG. 13 illustrates the closing phase of the front end of the roof in a schematic side view with the centering aids shown.
Figure 15:
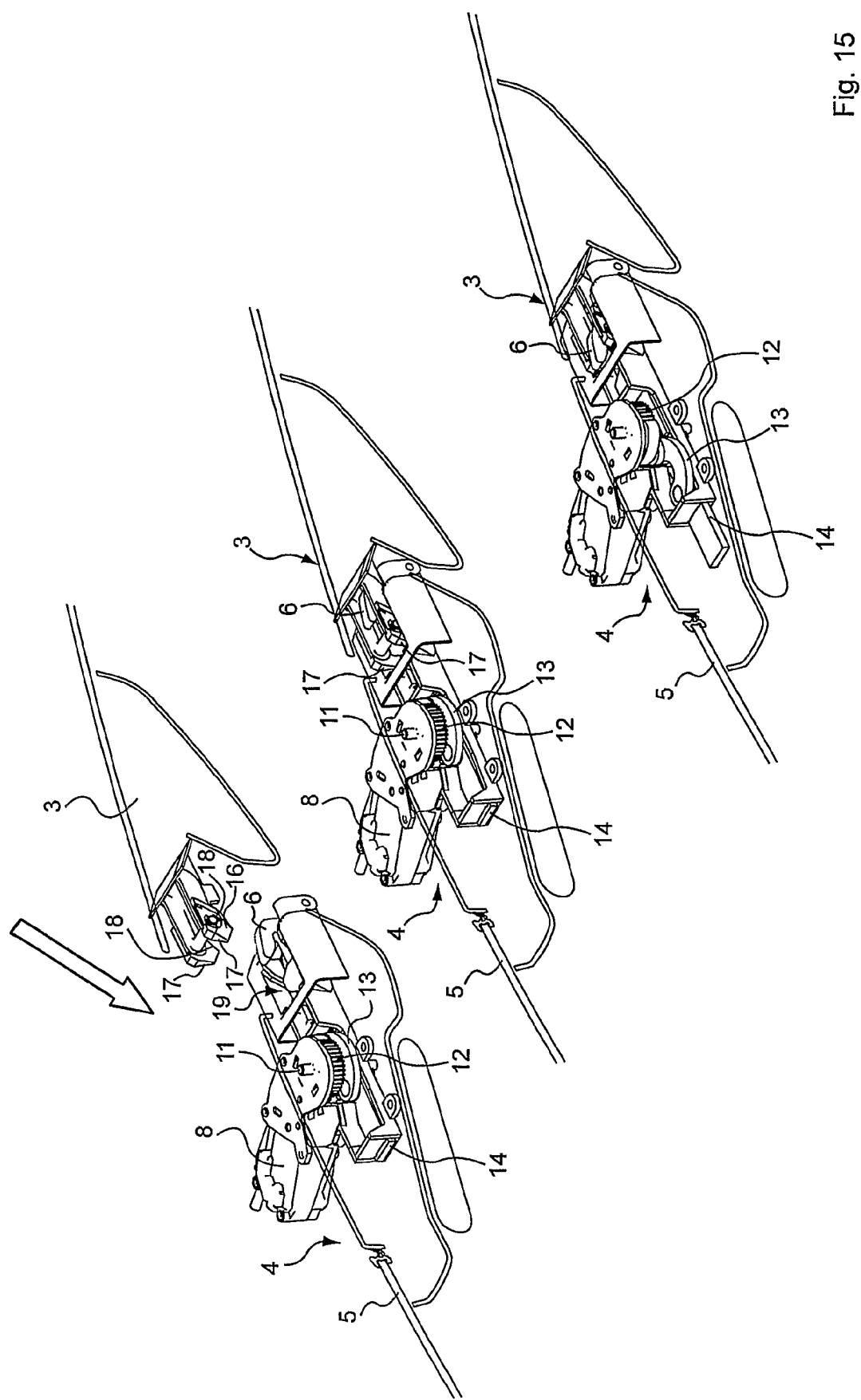
FIG. 15 illustrates the closing phase of FIG. 14 in a schematic perspective view.

As shown in FIG. 13, only a single sensor 20 is required at each connection between the windshield frame and the front end 3 of the roof since the correct positioning and engagement of the latch 7 into its end position E can be detected together. Further components can thereby be saved.

Figure 16:
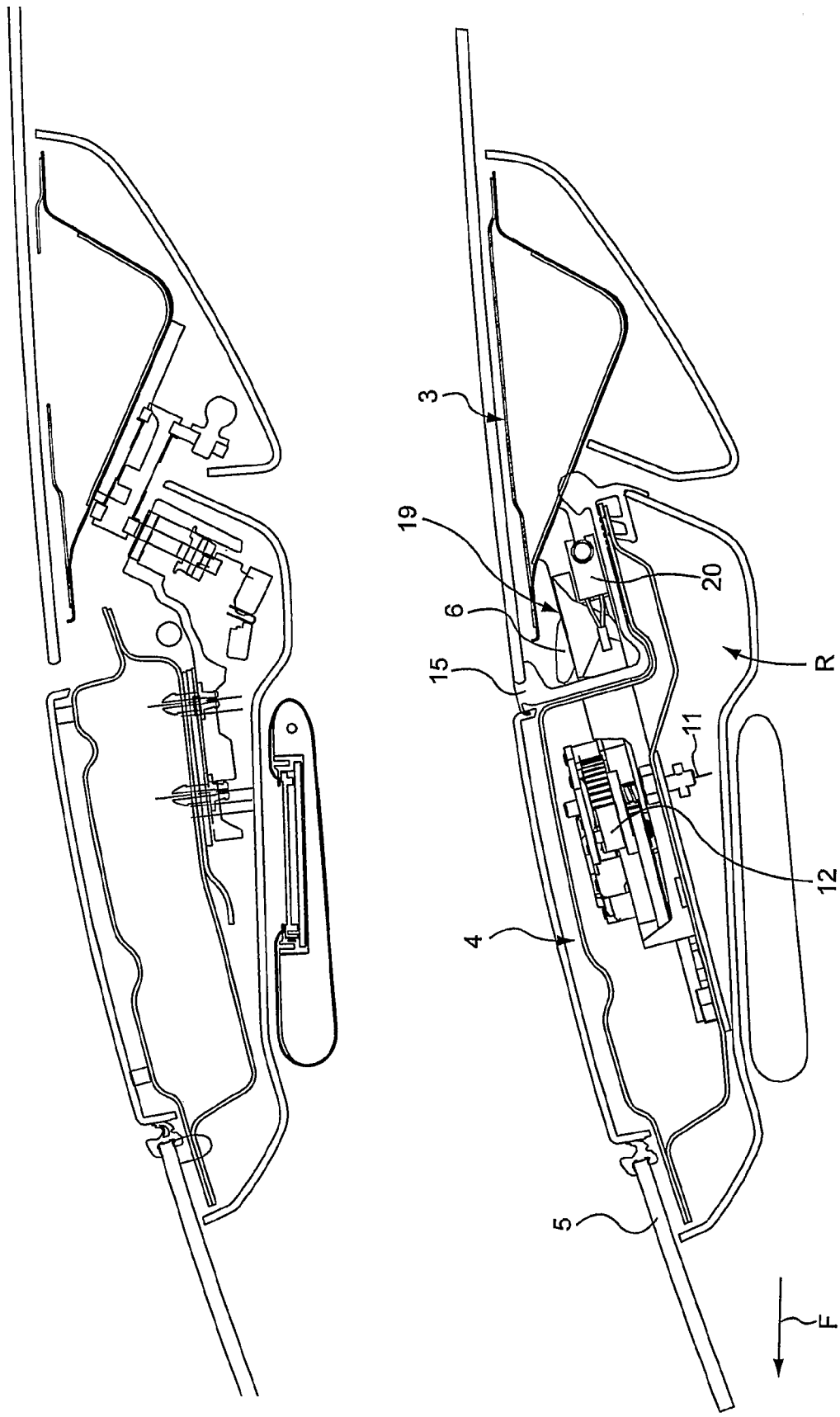
FIG. 16 is a side view illustrating a comparison between the amount of space required for a conventional system and the amount of space required in accordance with the present invention.
Figure 17:
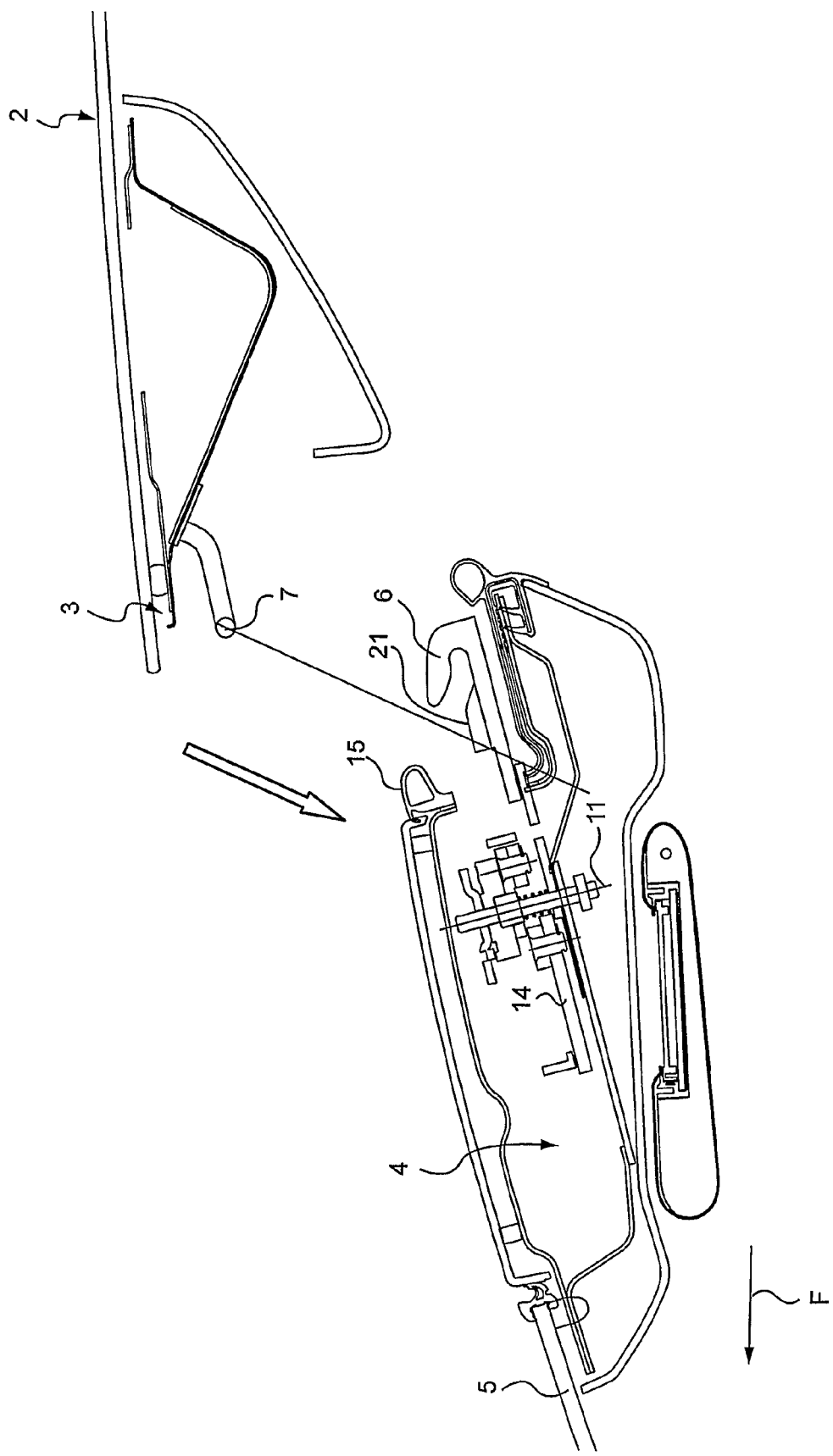
FIG. 17 is a similar view to FIG. 5 with a trajectory of the roof tip illustrated.

As shown in FIG. 16, the illustrated embodiment of the present invention saves substantial space R below the closures. This space can be used, for example, as a head impact surface during an accident. In addition, substantial space is also gained transversely between the closures due to the small size and the lack of a coupling linkage.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A convertible vehicle comprising:
   a vehicle body having a windshield frame with an upper transverse frame part;
   a convertible roof having a front end;
   at least one hook part disposed in the upper transverse frame part, the at least one hook part being linearly movable in the upper transverse frame part, the at least one hook part moving linearly forwardly to latch the front end of the roof to the upper transverse frame part; and
   a drive for moving the at least one hook part, the drive being disposed in the upper transverse frame part.

2. The convertible vehicle according to claim 1, wherein the at least one hook part has a direction of movement that is forward and slightly downward.

3. The convertible vehicle according to claim 1, wherein the at least one hook part comprises at least two hook parts disposed close to transverse sides of the vehicle.

4. The convertible vehicle according to claim 1, wherein the drive is an electric motor operable to drive the at least one hook part.

5. The convertible vehicle according to claim 4, wherein the electric motor has a drive shaft that is disposed generally parallel to a transverse axis defined by the upper transverse frame part.

6. The convertible vehicle according to claim 1, further comprising:
   a drive wheel that is rotatable about an axis generally perpendicular to a direction of movement of the at least one hook part; and
   a force transmitting member driving the at least one hook part.

7. The convertible vehicle according to claim 6, wherein the force transmitting member is curved such that it does not intersect the axis of rotation of the drive wheel.

8. The convertible vehicle according to claim 1, wherein the at least one hook part has an upwardly facing opening and defines a vertical capture path in the range of 5 to 9 millimeters during movement of the at least one hook part in a closing direction.

9. The convertible vehicle according to claim 1, further comprising:
   a latch disposed on the front end of the roof to engage the at least one hook part; and
   centering aids associated with the latch and the at least one hook part to transversely and longitudinally position the roof of the vehicle.

10. The convertible vehicle according to claim 9, wherein the centering aids include tapered surfaces disposed beside the latch and a complimentary funnel disposed by the at least one hook part.

11. The convertible vehicle according to claim 10, wherein the tapered surfaces include tapered surfaces that face towards each transverse side of the vehicle and tapered surfaces that face to the front and the rear of the vehicle.

12. The convertible vehicle according to claim 1, further comprising a contact surface associated with the at least one hook part for limiting the engagement depth of the front end of the roof.

13. The convertible vehicle according to claim 1, further comprising a latch disposed on the front end of the roof, the at least one hook part engaging the latch and moving the latch in a range of 0 to 6 millimeters.

14. The convertible vehicle according to claim 1, further comprising a single sensor associated with each connection between the windshield frame and the front end of the roof.

15. A convertible vehicle comprising:
   a vehicle body having a windshield frame with an upper transverse frame part;
   a convertible roof having a front end;
   at least one hook part disposed in the upper transverse frame part, the at least one hook part being linearly movable in the upper transverse frame part, the at least one hook part having a direction of movement that is forward and slightly downward; and
   a drive for moving the at least one hook part, the drive being disposed in the upper transverse frame part.

16. The convertible vehicle according to claim 15, wherein the at least one hook part comprises at least two hook parts disposed close to transverse sides of the vehicle.

17. The convertible vehicle according to claim 15, wherein the drive is an electric motor operable to drive the at least one hook part.

18. The convertible vehicle according to claim 17, wherein the electric motor has a drive shaft that is disposed generally parallel to a transverse axis defined by the upper transverse frame part.

19. The convertible vehicle according to claim 15, further comprising:
   a drive wheel that is rotatable about an axis generally perpendicular to a direction of movement of the at least one hook part; and
   a force transmitting member driving the at least one hook part.

20. The convertible vehicle according to claim 19, wherein the force transmitting member is curved such that it does not intersect the axis of rotation of the drive wheel.

21. The convertible vehicle according to claim 15, wherein the at least one hook part has an upwardly facing opening and defines a vertical capture path in the range of 5 to 9 millimeters during movement of the at least one hook part in a closing direction.

22. The convertible vehicle according to claim 15, further comprising:
   a latch disposed on the front end of the roof to engage the at least one hook part; and
   centering aids associated with the latch and the at least one hook part to transversely and longitudinally position the roof of the vehicle.

23. The convertible vehicle according to claim 22, wherein the centering aids include tapered surfaces disposed beside the latch and a complimentary funnel disposed by the at least one hook part.

24. The convertible vehicle according to claim 22, wherein the tapered surfaces include tapered surfaces that face towards each transverse side of the vehicle and tapered surfaces that face to the front and the rear of the vehicle.

25. The convertible vehicle according to claim 15, further comprising a contact surface associated with the at least one hook part for limiting the engagement depth of the front end of the roof.

26. The convertible vehicle according to claim 15, further comprising a latch disposed on the front end of the roof, the at least one hook part engaging the latch and moving the latch in a range of 0 to 6 millimeters.

27. The convertible vehicle according to claim 15, further comprising a single sensor associated with each connection between the windshield frame and the front end of the roof.

28. A convertible vehicle comprising:
a vehicle body having a windshield frame with A pillars and an upper transverse frame part;
a convertible roof having a front end; and
at least one hook part disposed in the upper transverse frame part, the at least one hook part being linearly movable in the upper transverse frame part, the at least one hook part moving linearly forwardly to latch the front end of the roof to the upper transverse frame part;
wherein the at least one hook part is disposed inboard of the A pillars.

29. The convertible vehicle according to claim 28, wherein the at least one hook part has a direction of movement that is forward and slightly downward.

30. The convertible vehicle according to claim 28, wherein the at least one hook part comprises at least two hook parts disposed close to transverse sides of the vehicle.

31. The convertible vehicle according to claim 28, further comprising an electric motor operable to drive the at least one hook part.

32. The convertible vehicle according to claim 31, wherein the electric motor has a drive shaft that is disposed generally parallel to a transverse axis defined by the upper transverse frame part.

33. The convertible vehicle according to claim 28, further comprising:
a drive wheel that is rotatable about an axis generally perpendicular to a direction of movement of the at least one hook part; and
a force transmitting member driving the at least one hook part.

34. The convertible vehicle according to claim 33, wherein the force transmitting member is curved such that it does not intersect the axis of rotation of the drive wheel.

35. The convertible vehicle according to claim 28, wherein the at least one hook part has an upwardly facing opening and defines a vertical capture path in the range of 5 to 9 millimeters during movement of the at least one hook part in a closing direction.

36. The convertible vehicle according to claim 28, further comprising:
a latch disposed on the front end of the roof to engage the at least one hook part; and
centering aids associated with the latch and the at least one hook part to transversely and longitudinally position the roof of the vehicle.

37. The convertible vehicle according to claim 36, wherein the centering aids include tapered surfaces disposed beside the latch and a complimentary funnel disposed by the at least one hook part.

38. The convertible vehicle according to claim 37, wherein the tapered surfaces include tapered surfaces that face towards each transverse side of the vehicle and tapered surfaces that face to the front and the rear of the vehicle.

39. The convertible vehicle according to claim 28, further comprising a contact surface associated with the at least one hook part for limiting the engagement depth of the front end of the roof.

40. The convertible vehicle according to claim 28, further comprising a latch disposed on the front end of the roof, the at least one hook part engaging the latch and moving the latch in a range of 0 to 6 millimeters.

41. The convertible vehicle according to claim 28, further comprising a single sensor associated with each connection between the windshield frame and the front end of the roof.

* * * * *